United States Patent
Snyder, II et al.

(10) Patent No.: US 9,460,033 B2
(45) Date of Patent: Oct. 4, 2016

(54) APPARATUS AND METHOD FOR INTERRUPT COLLECTING AND REPORTING STATUS AND DELIVERY INFORMATION

(71) Applicant: Cavium, Inc., San Jose, CA (US)

(72) Inventors: Wilson Parkhurst Snyder, II, Holliston, MA (US); Lei Tian, Boxborough, MA (US)

(73) Assignee: Cavium, Inc., San Jose, CA (US)

( * ) Notice: Subject to any disclaimer, the term of this patent is extended or adjusted under 35 U.S.C. 154(b) by 398 days.

(21) Appl. No.: 14/141,681

(22) Filed: Dec. 27, 2013

(65) Prior Publication Data
US 2015/0186308 A1   Jul. 2, 2015

(51) Int. Cl.
*G06F 13/00* (2006.01)
*G06F 13/26* (2006.01)

(52) U.S. Cl.
CPC ............ *G06F 13/26* (2013.01); *Y02B 60/1228* (2013.01)

(58) Field of Classification Search
CPC ........................... G06F 13/26; Y02B 60/1228
USPC ................................................ 710/313, 267
See application file for complete search history.

(56) References Cited

U.S. PATENT DOCUMENTS

| | | | | |
|---|---|---|---|---|
| 5,381,552 A | * | 1/1995 | Dahlberg | G06F 13/26 710/264 |
| 5,428,794 A | * | 6/1995 | Williams | G06F 15/17 710/268 |
| 5,557,744 A | * | 9/1996 | Kobayakawa | G06F 15/17 709/232 |
| 5,850,558 A | * | 12/1998 | Qureshi | G06F 13/24 710/264 |
| 6,553,443 B1 | * | 4/2003 | Baqai | H04Q 3/54591 710/260 |
| 6,792,483 B2 | * | 9/2004 | Schmidt | G06F 3/0601 710/260 |
| 7,263,568 B2 | * | 8/2007 | Shah | G06F 13/24 370/412 |
| 8,504,750 B1 | * | 8/2013 | Sonksen | G06F 13/36 710/243 |
| 2007/0283067 A1 | * | 12/2007 | Patella | G06F 13/24 710/260 |
| 2008/0071947 A1 | * | 3/2008 | Fischer | G06F 13/24 710/48 |
| 2010/0077399 A1 | * | 3/2010 | Plondke | G06F 9/4818 718/103 |

* cited by examiner

*Primary Examiner* — Tammara Peyton
(74) *Attorney, Agent, or Firm* — pkalousek.ip

(57) ABSTRACT

A method and a system embodying the method for interrupt collecting an reporting, comprising: storing for each of at least one interrupt a status indicator, an enable status, and an interrupt delivery information in a first structure; storing for each of the at least one interrupt at least an indicator of one or more entities to execute an interrupt handler routine in a second structure; and reporting one of the at least one interrupt to the one or more entities to execute an interrupt handler routine designated in accordance with the status indicator, the enable status, the interrupt delivery information, and the at least one indicator, is disclosed.

16 Claims, 3 Drawing Sheets

APPARATUS AND METHOD FOR INTERRUPT COLLECTING AND REPORTING STATUS AND DELIVERY INFORMATION

BACKGROUND

1. Field

The present disclosure relates to processors. More particularly, this invention is directed toward a processing of an interrupt collecting and reporting.

2. Description of Related Technology

During a processor's operation, an interrupt may be received at the processor. An interrupt is a signal originated by a hardware or a software entity, which alerts the processor to an event that needs the processor's immediate attention. In response, the processor suspends current operation, saves the state of the operation, and executes an interrupt handler program. After the interrupt handler finishes attending to the interrupt, the processor resumes execution of the interrupted operation.

The interrupt may be received as a change in a level of a signal or a change of an edge of a signal on a wire. The disadvantage of such a solution is a potentially large implementation costs, as a wire is required for each of the hardware or the software entity. Furthermore, generated plurality of interrupts may be written into a wide register with bits for all possible interrupts, or into a tree of such registers; consequently, the processor needs to spend resources and time to search through the wide register or the tree of such registers to determine hardware or a software entity that originated the interrupt.

In another method a software entity, e.g., a kernel, programs a "vector number" into each of the hardware or the software entities originating interrupt(s), and the hardware or the software entity signals via a message, e.g., a Direct Memory Access (DMA) write, when an interrupt occurs. The disadvantage of such a method is an implementation cost because each of the hardware or the software entities needs to store an interrupt number for each vector number, and the programming software entity needs to configure this information. Furthermore, level sensitive interrupts are generally not supported.

Accordingly, there is a need in the art for interrupt collecting an reporting, providing a solution to the above identified problems, as well as additional advantages.

SUMMARY

In an aspect of the disclosure, an apparatus and a method for interrupt collecting an reporting according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

Figure 1A:
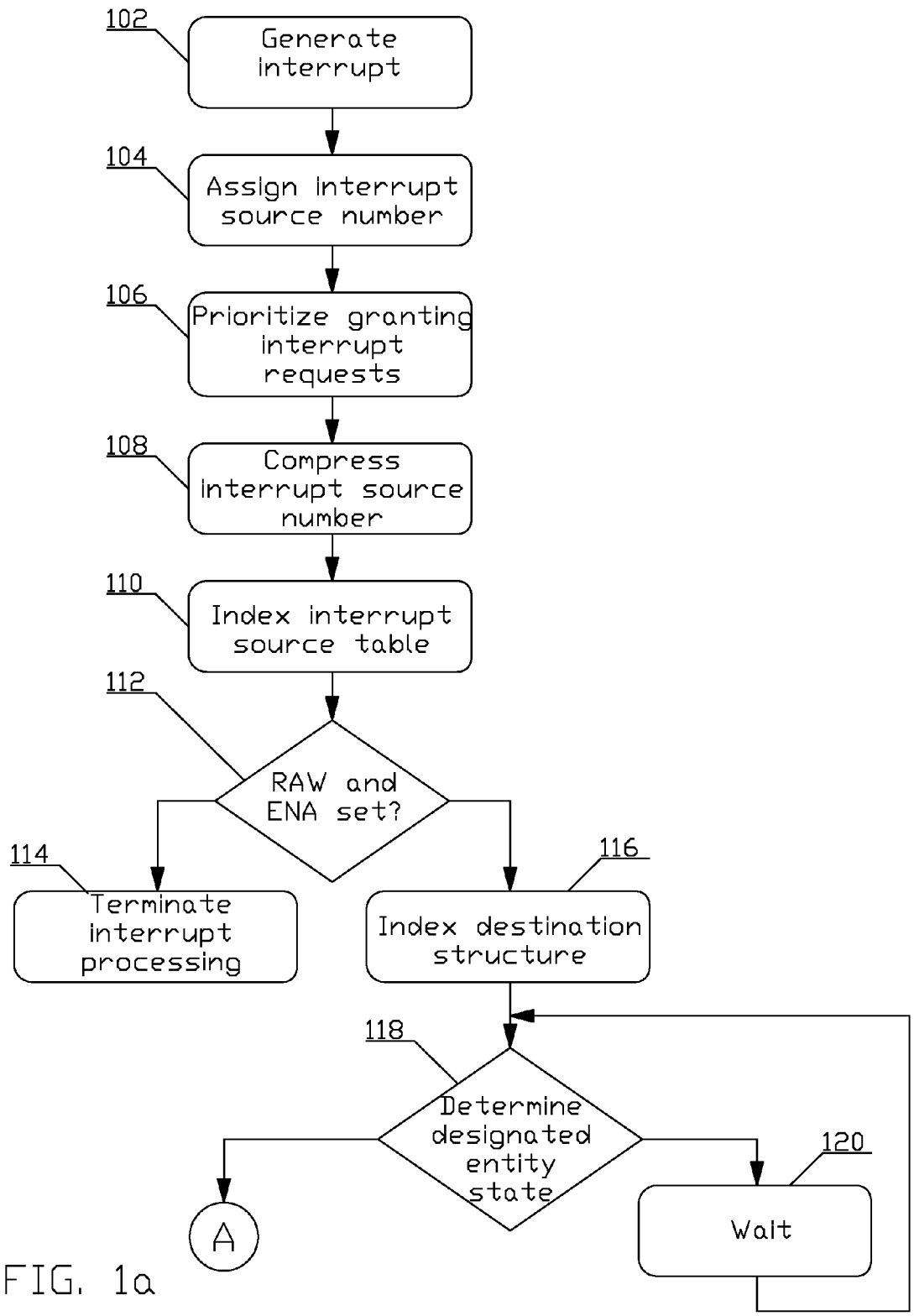
FIG. 1a depicts a first part of a flow chart enabling a process for interrupt collecting and reporting in accordance with aspects of this disclosure.
Figure 1B:
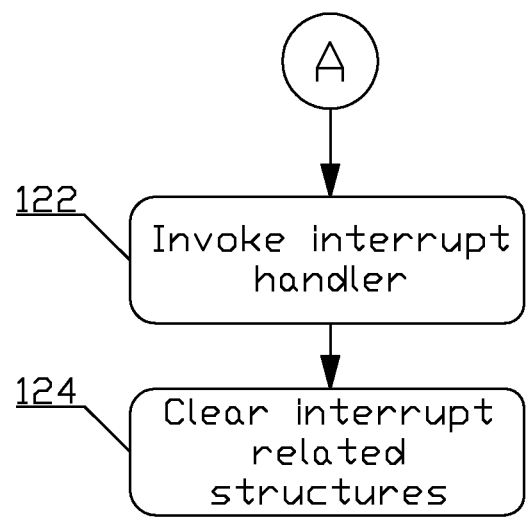
FIG. 1b depicts a second part of the flow chart enabling the process for interrupt collecting and reporting in accordance with aspects of this disclosure.
Figure 2:
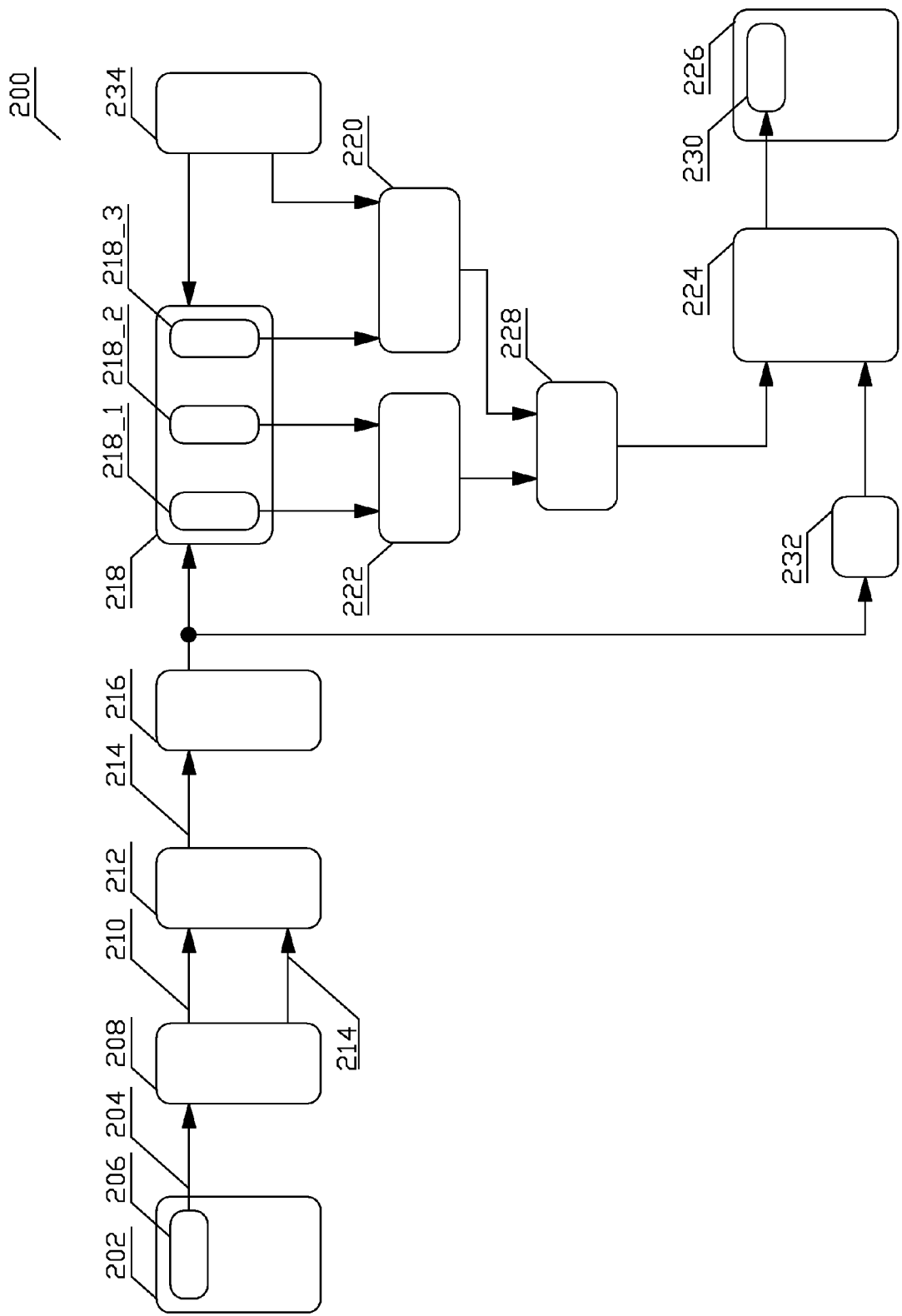
FIG. 2 depicts a conceptual structure in a form of a block diagram of principal elements enabling the process of interrupt collecting and reporting in accordance with an aspect of this disclosure.

FIGS. 1a-1b, depict a flow chart enabling a process for interrupt collecting and reporting. To clarify the relationship between certain elements of the block diagram 2200 depicted in FIG. 2 referenced in FIGS. 1a-1b and associated text, references to the elements of the block diagram 200, depicting a conceptual structure and information flow among the elements of the structure enabling the process, are in parenthesis. The elements comprise hardware or software entities implementing the blocks and/or the blocks' functionality.

In block 102 a hardware or a software entity (202) generating an interrupt (204) sets a status indicator in a structure (206) to indicate the interrupt and provides the interrupt (204) to a block (208). In an aspect, the status indicator comprises a raw status bit (RAW), i.e., active or inactive, and the structure (206) comprises a register. A register is a small amount of storage available as part of a Central Processor Unit (CPU) or other digital processor. Such registers are (typically) addressed by mechanisms other than main memory and can be accessed more quickly. The active status indicates that the interrupt has been generated and is in a process of being collected, i.e., information needed for reporting the interrupt to an entity to execute an interrupt handler routine is being gathered and organized. Reporting notifies one or more entities to execute an interrupt handler routine that an interrupt is asserted, i.e., ready to be provided to the entity to execute an interrupt handler routine. In an aspect, an entity (226) to execute an interrupt handler routine comprises a processor core. In another aspect, the entity (226) to execute an interrupt handler routine comprises a PCI controller. Upon receiving asserted interrupt, the PCI controller delivers the asserted interrupt to the PCI host (not shown) at the remote end of a PCI link.

In an aspect, the interrupt (204) is accompanied with status indicator(s) of other interrupt(s) that had been sent by the hardware or the software entity (202) for other interrupts. The process continues in block 104.

In block 104, each of the interrupts received at the interrupt labeler block (208) is assigned a unique number, an Interrupt Source Number (INTSN) (214). To accommodate all the hardware or the software entities that may generate an interrupt, INTSN must have an appropriate size. In an aspect the size of the INTSN comprises 20 bits. The block (208) stores the INTSN (214) and the status indicator in a structure that allows the block (208) to track, which interrupts have changed status. In an aspect, the INTSNs are stored in a data structure separate from the status indicator. In another aspect, the INTSNs are not stored, but implied by the structure. By means of an example, the address to the storage of the status indicator implies the value of the INTSN. When the block (208) detects an interrupt status change, caused by e.g., a new interrupt having been generated, an interrupt processing being finished, or any other event changing the interrupt's status, the block (208) provides an arbitration request (210) to an arbitration block (212). The process continues in block 106.

In block 106, the arbitration block (212) receives the arbitration request (210). Because the arbitration block (212) may receive a plurality of arbitration requests, the arbitration block (212) prioritizes the received arbitration requests and grants the arbitration request with the highest priority. The priorities are established, e.g., by a round-robin scheduling among the arbitration requests, e.g., in a manner that the least-recently set active arbitration request receives the highest priority, or other method known to a person of ordinary skills in the art. The processing continues in block 108.

In block 108, the INTSN (214) together with the interrupt status associated with the granted request is provided to a compressor block (216). As disclosed, an INTSN must be of a size to accommodate all the possible interrupts, which might be relatively large, e.g., 20 bits in an aspect, which would require an adequately large storage space. However, not all the hardware or the software entities generate a plurality of interrupts in the same system; consequently, many INTSNs may not be generated and the INTSN space is, therefore, sparse. Therefore, in an aspect, the compressor block (216) comprises a reversible function, compressing the INTSN (214) into a smaller numerical space. In an aspect, the compressed ISTSN (214) comprises a number between 0-12K. A person of ordinary skills in the art will understand that the compressor block (216) is optional, depending on a size of the INTSNs required by a specific system. By means of an example, in a system with smaller number of hardware or software entities generating interrupts, less interrupts may be generated; therefore, requiring a smaller INTSN size, which in turn may not require compression. The processing continues in block 110.

In block 110, the compressed INTSN (214) is provided to an interrupt source control (ISC) structure (218). The compressed INTSN (214) is used as an index to the interrupt source control structure (218), which maps the compressed INTSN (214) onto the status indicator (RAW) (218_1), i.e., active or inactive, an information whether the interrupt is enabled or disabled (ENA) (218_2), and an Interrupt Delivery (ID) information (218_3) designating one or more entities (226) to execute an interrupt handler routine, to which the interrupt assigned the INTSN (214) will be reported. Since the status is provided by the arbitration block (212), any change in the status detected by the arbitration block (212) is reflected in the interrupt source control structure (218).

The ENA is controlled by a software entity, e.g., the kernel based on the activity and availability of the entities to execute an interrupt handler routine.

The reason for the ID information (218_3) is that there may be a plurality of entities (226) capable of executing an interrupt handler routine. Furthermore, in an aspect, each of the plurality of entities (226) may have different priority level interrupts; therefore, in this aspect the ID information (218_3) indicates an entity (226) and a priority level for the entity (226). A priority level indicates interrupt reports that are accepted by an entity (226). Priority levels are dependent on an architecture of the entities (226). Some architectures permit two values, indicating that all interrupt reports are enabled, or that all interrupt reports are disabled; other architectures permit a greater range of values, where each value enables interrupt reports that specify a higher level, while blocking interrupt reports from the same or lower level. The priority level is determined by the kernel, based on relative importance of different interrupt reports.

The processing continues in block 112.

In block 112, the status of the RAW (218_1) and the ENA (218_2) for each INTSN (214) are determined in block (222). In an aspect, the block (222) may comprise a logical AND. When either the RAW (218_1) indicates an inactive interrupt status or the ENA (218_2) indicates disabled, the processing continues in block 114.

Otherwise when the RAW (218_1) indicates an active interrupt status and the ENA (218_2) indicates enabled for a specific INTSN (214), the interrupt assigned the INTSN (214) is asserted. The ID information (218_3) corresponding to the interrupt assigned INTSN (214) is provided to an interrupt delivery structure (220). The ID information (218_3) is used as an index to the interrupt delivery structure (220), which maps the ID information (218_3) onto one or more of the plurality of the entities (226). The mapping further depends on the configuration of the plurality of the entities (226). For example some entities (226) may not be configured to accept certain priority levels. In an aspect, the interrupt delivery structure (220) comprises a table.

Dividing the collected information between the structure (218) and the structure (220) reduces the size of the structure (218) and the structure (220) compared to a structure that would be needed to keep the collected information in a single structure. Since each of the RAW (218_1) and the ENA (218_2) comprise only two possibilities, the RAW (218_1) and the ENA (218_2) may each be represented by a single bit, each of the bits being held in a separate one-bit register. Such a size reduction directly translates to space and power savings of implementation on an integrated circuit.

The division of the collected information also allows a fast change in reporting the asserted interrupts generated by the hardware or the software entities at approximately the same time to one or more entities to execute an interrupt handler routine. Thus, by means of an example when multiple asserted interrupts comprise the same ID information (218_3), thus designating the same one or more entities (226), the interrupt delivery structure (220) selects one of the asserted interrupts. In an aspect, the first asserted interrupt is selected; then the interrupt delivery structure (220) round-robins between the remaining asserted interrupts. The processing continues in block 116.

In block 114, when the interrupt status is inactive because the interrupt has already been reported to the one or more of the entities (226), the processing related to the interrupt collecting is finished because after the interrupt will have been processed by the one or more of the entities (226), the interrupt will be cleared as disclosed infra.

In block 116, the ID information (218_3) is provided to a destination structure (224) via an enabling structure (228). In an aspect, the enabling structure (228) comprises logical AND. The destination structure (224) keeps a state of each of the entities' (226) priority levels. The state comprises pending when an entity (226) is executing an interrupt handler routine for a priority level, and the state comprises not pending when an entity (226) is not executing an interrupt handler routine for the priority level. Each of the entities (226) updates the state, upon starting or ending execution of an interrupt handler routine at a priority level. The processing continues in block 118.

In step 118, the state of the one or more entities (226) designated to execute an interrupt handler routine for the asserted interrupt assigned the INTSN (214) is determined. If the state indicates not pending, the process continues in block 122; otherwise, the process continues in step 120.

In step 120, a waiting period for a change of a state of the designated one or more entities (226) of step 118 is entered. The processing continues in block 118.

In block 122, the asserted interrupt is reported by sending a notification to the designated one or more entities (226). A software entity (230) running at the designated one or more entities (226) invokes an interrupt handler routine. A hardware expander (232) retrieves the compressed INTSN (214) assigned to the asserted interrupt from the compressor block (216) and decompresses the compressed INTSN (214) to determine, which asserted interrupt to execute by the interrupt handler routine.

When an asserted interrupt is reported to the designated one or more entities (226), the state of the designated one or more entities (226) in interrupt delivery structure (224) must also be updated. Any newly generated interrupt or change in a register (218_1) or (218_2) that causes an interrupt to assert, e.g., by changing the status of the RAW (218_1) or the ENA (218_2) when the asserted interrupt is already executing by the interrupt handler routine would cause the interrupt delivery structure (224) to nearly instantly assert the interrupt. Therefore, an entity (234) which detects such a change scans structure (218) and de-asserts any interrupts with the same ID information (218_3).

The processing continues in step 124.

In block 124, the software entity (230) or the interrupt handing software handler routine clears the status indicator RAW (218_1) in a structure (206), i.e., sets the status indicator RAW (218_1) to inactive. Clearing the status indicator RAW (218_1) is propagated through block (208), (212), (216) to clear the status indicator RAW (218_1) in block (218) or vice versa, i.e., the status indicator RAW (218_1) in the block 218 is cleared, which propagates to the block 206.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for interrupt collecting an reporting, comprising:
    storing for each of at least one interrupt a status indicator, an enable status, and an interrupt delivery information in a first structure;
    storing for each of the at least one interrupt at least an indicator of one or more entities to execute an interrupt handler routine in a second structure; and
    reporting one of the at least one interrupt to the one or more entities to execute an interrupt handler routine designated in accordance with the status indicator, the enable status, the interrupt delivery information, and the at least one indicator.

2. The method as claimed in claim 1, further comprising:
    assigning a unique number to each of the at least one interrupt; wherein
    the first structure is indexed by the unique number; and
    the second structure is indexed by the interrupt delivery information.

3. The method as claimed in claim 2, further comprising:
    compressing the assigned unique number; and wherein
    the first structure is indexed by the compressed unique number.

4. The method as claimed in claim 1, wherein the storing at least an indicator of one or more entities to execute an interrupt handler comprises:
    storing an indicator and a priority level of the one or more entities to execute an interrupt handler routine.

5. The method as claimed in claim 2, wherein the reporting one of the at least one interrupt to the designated one or more entities to execute an interrupt handler routine comprises:
    determining an asserted interrupt of the at least one interrupt in accordance with the status indicator and the enable status; and
    reporting the asserted interrupt to the one or more entities to execute an interrupt handler routine designated in accordance with the interrupt delivery information and the at least an indicator.

6. The method as claimed in claim 5, wherein the reporting the asserted interrupt to the one or more entities to execute an interrupt handler routine designated in accordance with the interrupt delivery information and the at least an indicator comprises:
    determining the interrupt delivery information for the asserted interrupt;
    determining the at least an indicator of the designated one or more entities to execute an interrupt handler routine for the asserted interrupt in accordance with the determined interrupt delivery information; and
    reporting the asserted interrupt to the designated one or more entities to execute an interrupt handler routine in accordance with the determined at least an indicator.

7. The method as claimed in claim 5, further comprising:
    determining the unique number assigned to the asserted interrupt; and
    executing the asserted interrupt assigned the determined unique number.

8. The method as claimed in claim 7, further comprising:
    determining whether the unique number is compressed; and
    decompressing the unique number when the determining is positive.

9. An apparatus for interrupt collecting an reporting, comprising:
    a first structure configured to store for each of at least one interrupt a status indicator, an enable status, and an interrupt delivery information;
    a second structure, communicatively coupled to the first structure, configured to store for each of the at least one interrupt at least an indicator of one or more entities to execute an interrupt handler routine; and
    a destination structure, communicatively coupled to the first structure and the second structure, configured to report one of the at least one interrupt to the one or more entities to execute an interrupt handler routine designated in accordance with the status indicator, the enable status, the interrupt delivery information, and the at least an indicator.

10. The apparatus as claimed in claim 9, further comprising:
    an interrupt labeler configured to assign a unique number to each of the at least one interrupt; wherein
    the first structure is indexed by the unique number; and
    the second structure is indexed by the interrupt delivery information.

11. The apparatus as claimed in claim 10, further comprising:
    a compressor configured to compress the assigned unique number; and
    wherein the first structure is indexed by the compressed unique number.

12. The apparatus as claimed in claim 9, wherein the second structure is further configured to:
    store for each of the at least one interrupt an indicator and a priority level of the one or more entities to execute an interrupt handler routine.

13. The apparatus as claimed in claim 10, wherein the destination structure reports one of the at least one interrupt to the designated one or more entities to execute an interrupt handler routine by being configured to:
    determine an asserted interrupt of the at least one interrupt in accordance with the status indicator and the enable status; and
    report the asserted interrupt to the one or more entities to execute an interrupt handler routine designated in accordance with the interrupt delivery information and the at least an indicator.

14. The apparatus as claimed in claim 13, wherein the destination structure reports the asserted interrupt to the one or more entities to execute an interrupt handler routine designated in accordance with the interrupt delivery information and the at least an indicator by being configured to:
    determine the interrupt delivery information for the asserted interrupt;
    determine the at least an indicator of the designated one or more entities to execute an interrupt handler routine for the asserted interrupt in accordance with the determined interrupt delivery information; and
    report the asserted interrupt to the designated one or more entities to execute an interrupt handler routine in accordance with the determined at least an indicator.

15. The apparatus as claimed in claim 13, wherein the designated one or more entities to execute an interrupt handler routine is configured to:
    determine the unique number assigned to the asserted interrupt; and
    execute the asserted interrupt assigned the determined unique number.

16. The apparatus as claimed in claim 15, wherein the designated one or more entities to execute an interrupt handler routine is further configured to:
    determine whether the unique number is compressed; and
    decompress the unique number when the determining is positive.

\* \* \* \* \*